United States Patent [19]

Doolittle

[11] Patent Number: 5,713,429
[45] Date of Patent: Feb. 3, 1998

[54] POWER STEERING SYSTEM

[75] Inventor: Marc Doolittle, Morristown, Tenn.

[73] Assignee: TRW Inc., Lyndhurst, Ohio

[21] Appl. No.: 431,123

[22] Filed: Apr. 28, 1995

[51] Int. Cl.$^6$ ................................................. B62D 5/04
[52] U.S. Cl. ........................ 180/423; 180/441; 91/371; 91/372
[58] Field of Search .................................. 180/417, 421, 180/422, 423, 426, 429, 441; 91/371, 372, 370, 433, 434; 137/625.23, 625.24

[56] References Cited

U.S. PATENT DOCUMENTS

| | | | |
|---|---|---|---|
| 3,998,131 | 12/1976 | Adams | 91/372 |
| 4,606,424 | 8/1986 | Hasegawa | 180/143 |
| 4,759,420 | 7/1988 | Schipper, Jr. et al. | 180/423 |
| 4,768,605 | 9/1988 | Miller et al. | 180/143 |
| 4,819,545 | 4/1989 | Dymond | 91/371 |
| 5,230,273 | 7/1993 | Fraley, Jr. | 180/441 X |
| 5,291,963 | 3/1994 | Sangret | 180/141 |
| 5,293,954 | 3/1994 | Dymond | 180/141 |
| 5,339,917 | 8/1994 | Eberhart | 180/143 |
| 5,357,845 | 10/1994 | Sangret | 180/441 X |
| 5,367,235 | 11/1994 | Fukudome | 180/423 X |
| 5,439,070 | 8/1995 | Haga et al. | 180/429 X |

Primary Examiner—Victor E. Johnson
Attorney, Agent, or Firm—Tarolli, Sundheim, Covell Tummino & Szabo

[57] ABSTRACT

A power steering system includes first and second valve members (40 and 42) which are movable relative to each other to port fluid to a vehicle power steering motor (31) and a pump (24) for providing fluid to the first and second valve members (40 and 42) and the power steering motor. A force transmitting member (116) is connected with the first valve member (40) and movable toward and away from the second valve member (42) for applying a force to resist relative movement between the first and second valve members. A fluid pressure chamber (138) receives fluid from the pump (24), the pressure of which acts on the force transmitting member (116). The first and second valve members (40 and 42) include passages for conducting fluid to the fluid pressure chamber (138). A fixed size bleed orifice (182) conducts fluid from the pressure chamber (138) to a reservoir (32). The orifice (182) restricts the flow of fluid from the chamber (138) to the reservoir (32). A variable speed motor (14) which drives the pump (24) varies the flow rate of fluid to the chamber (138) as a function of vehicle speed to vary the pressure in the chamber.

21 Claims, 2 Drawing Sheets

POWER STEERING SYSTEM

BACKGROUND OF THE INVENTION

The present invention relates to a vehicle power steering system, and more specifically to a hydraulic vehicle power steering system which transmits a larger manual steering effort to the steered wheels at higher vehicle speeds than is transmitted at lower vehicle speeds.

A known power steering system includes an inner valve member which is coaxial with and rotatable relative to an outer valve member to port fluid to a power steering motor from a pump. It is known to increase the resistance felt by an operator of a vehicle to actuation of the power steering system as vehicle speed increases by having the fluid pressure in a reaction chamber decrease as vehicle speed increases. A solenoid valve conducts fluid from the pressure chamber to reservoir. The size of an orifice defined by the solenoid valve changes with variations in vehicle speed. The size of the orifice increases as vehicle speed increases to reduce the pressure in the pressure chamber and increase the resistance to relative rotation between the inner and outer valve members.

SUMMARY OF THE INVENTION

The present invention provides a new and improved power steering system for use in a vehicle to control the operation of a hydraulic power steering motor. The power steering system includes first and second valve members which are movable relative to each other to port fluid to the vehicle power steering motor and means for providing fluid to the first and second valve members and the power steering motor. A force transmitting member is connected with the first valve member and movable toward and away from the second valve member for applying a force to resist relative movement between the first and second valve members.

A fluid pressure chamber receives fluid from the fluid providing means. The pressure in the fluid pressure chamber acts on the force transmitting member. The first and second valve members include means for conducting fluid to the fluid pressure chamber. Means for conducting fluid from the chamber to reservoir includes means for restricting the flow of fluid from the chamber to reservoir. Means for varying the flow rate of fluid to the chamber from the source of fluid varies the flow rate as a function of vehicle speed to vary the pressure in the chamber and the resistance to relative movement between the first and second valve members.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF THE PREFERRED EMBODIMENT

Figure 1:
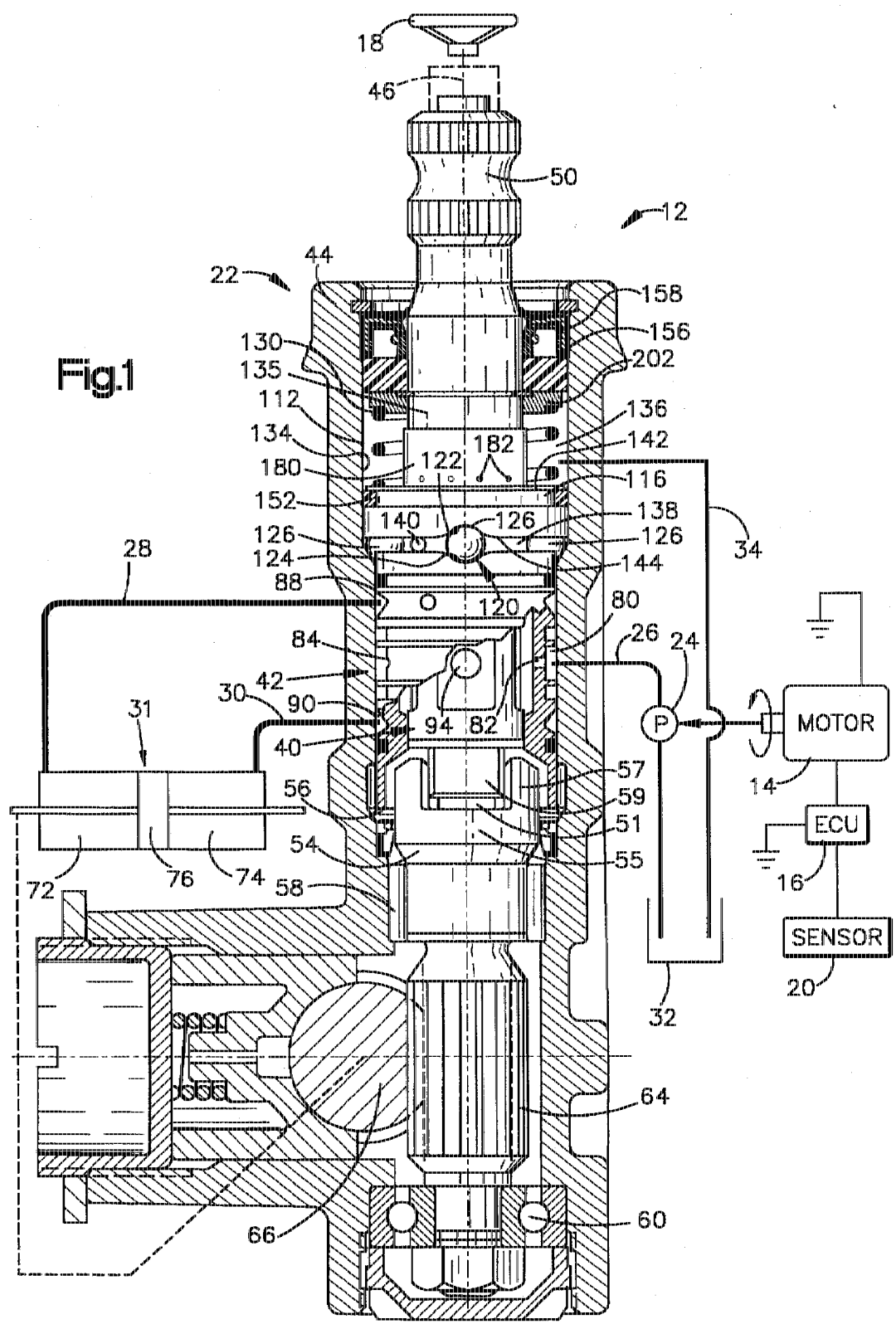
FIG. 1 is a schematic view of a vehicle power steering system and includes an enlarged sectional view of a power steering control valve.

A vehicle power steering system 12 (FIG. 1) is operable to turn steerable vehicle wheels (not shown) upon rotation of a steering wheel 18 by an operator of the vehicle. Rotation of the steering wheel 18 actuates a hydraulic power steering directional control valve 22 to port hydraulic fluid from a pump 24 and supply conduit 26 to either one of a pair of motor conduits 28 and 30. Preferably, the pump 24 is driven by an electric motor 14.

The speed at which the pump 24 is driven by the electric motor 14, and hence the flow rate of the pump, is determined by an electronic control unit or ECU 16. The ECU 16 receives a signal from a vehicle speed sensor 20. The ECU 16 causes the electric motor 14 to drive the pump 24 at a speed that is a function of vehicle speed. As the vehicle speed changes from low to high, the motor 14 reduces the speed of the pump 24, and hence the flow rate from the pump.

The ECU 16 effects operation of the motor 14 to drive the pump 24 at a speed which decreases as vehicle speed increases. Thus, when the vehicle is stationary or moving very slowly, the motor 14 drives the pump 24 at a relatively high speed to supply a larger flow rate of fluid to the control valve 22. As the speed of the vehicle increases, the speed at which the motor 14 drives the pump 24 decreases and the fluid flow rate supplied to the control valve 22 and the steering motor decreases. In the illustrated embodiment of the invention, the ECU 16 causes the speed at which the motor 14 drives the pump 24 to vary as an inverse function of vehicle speed.

The fluid under pressure conducted from the supply conduit 26 through one of the motor conduits 28 or 30 effects operation of a power steering motor 31 to turn the steerable vehicle wheels in one or another direction, as is well known in the art. Simultaneously, fluid is conducted from the motor 31 to a reservoir 32 through the other one of the motor conduits 28 or 30, the control valve 22, and return conduit 34.

The control valve 22 (FIG. 1) includes an inner rotary valve member 40 and an outer rotary valve member or sleeve 42. The outer valve member 42 encloses the inner valve member 40. The inner valve member 40 and outer valve member 42 are rotatable relative to (a) each other and (b) a housing 44 about a common central axis 46.

The inner valve member 40 is formed on a part of a cylindrical input member or valve stem 50 which is connected with the steering wheel 18. The outer valve member 42 is connected with a follow-up member 54 by a pin 56. The follow-up member 54 is rotatably supported in the housing 44 by bearings 58 and 60. The follow-up member 54 has a pinion gear portion 64 which is in meshing engagement with the toothed portion of a rack 66. The rack 66 is drivingly connected with the power steering motor 31 and steerable vehicle wheels, as is well known in the art.

The inner valve member 40 and the outer valve member 42 are drivingly interconnected through a resilient torsion bar spring 51 (which is only partially visible in FIG. 1), as is well known in the art, and a drive mechanism 55 defined by dogs 57 on an end of the follow-up member 54 and tines 59 on an end of the input member 50. The dogs 57 and the tines 59 allow limited rotational movement of the input member 50 relative to the follow-up member 54 when the torque in the pinion gear portion 64 required to displace the rack 66 exceeds the torque required to deflect the torsion bar 51. Hence, the input member 50 can be displaced by a few degrees relative to the follow-up member 54 with the displacement occurring in the torsion bar 51.

The outer valve member 42 is fixed against rotation relative to the follow-up member 54 by pin 56. Accordingly, the input member 50 and the inner valve member 40 can be rotated slightly with respect to the follow-up member 54 and the outer valve member 42. The amount of relative rotation, within the limits of the dog and tine drive mechanism 55, is proportional to the torque in the torsion bar 51 and other elements of the manual steering drive line, such as the follow-up member 54 and the input member 50. This relative rotation between the input member 50 and the outer valve member 42 is used to control the flow of hydraulic fluid from the pump 24 to the steering motor 31.

The control valve 22 (FIG. 1) is of the open-center type. Therefore, when the control valve 22 is in an initial or unactuated neutral condition, that is when there is no steering demand, fluid flow from the pump 24 is directed by the control valve 22 to the return conduit 34 and reservoir 32. Hence, fluid is circulated by the pump 24 through the valve 22 and back to the reservoir 32.

Upon rotation of the steering wheel 18 and rotation of the valve stem 50, the inner valve member 40, if there is sufficient resistance to displacement of the rack 66 caused by frictional engagement of the vehicle tires with the ground or road surface, will be rotated about the axis 46 relative to the outer valve member 42. This relative rotation moves valving edges on the inner valve member 40 relative to valving edges on the sleeve 42 which directs fluid from the pump 24 to one of the motor conduits 28 or 30 and directs fluid from the other motor conduit to the reservoir 32.

For example, rotation of the inner valve member 40 in one direction relative to the outer valve member 42 will reduce the flow area communicating the motor conduit 28 with the reservoir 32 and increase the flow area communicating the motor conduit 28 with the pump 24. The relative rotation between the inner valve member 40 and outer valve member 42 also increases the flow area communicating the motor conduit 30 with the reservoir and reduces the flow area communicating the motor conduit 30 with the pump 24. The result is fluid generated by the pump 24 is conducted to the motor cylinder chamber 72. This fluid will move the piston 76 toward the right, as viewed in FIG. 1. As the piston 76 moves toward the right, fluid is forced from the chamber 74 through the motor conduit 30, the control valve 22, and the return conduit 34 to the reservoir 32.

As the power steering motor 31 operates, the rack 66, which is also the rod for the motor 31, rotates the pinion 64 and follow-up member 54. This rotation of the follow-up member 54 together with the torque from the torsion bar 51 rotates the outer valve member 42 relative to the inner valve member 40 tending to return the valve 22 to its open center, neutral position. When the motor 31 is operated to turn the steerable vehicle wheels to an extent corresponding to the extent of rotation of the inner valve member 40, the feedback of the rotation of the follow-up member 54 caused by movement of the rack 66 rotates the pinion 64 through a distance sufficient to move the outer valve member 42 to its initial position relative to the inner valve member. When this occurs, the fluid pressure in the motor cylinder chambers 72 and 74 falls and equalizes and the motor 31 stops operating.

Pressurized fluid from the pump 24 is conducted to an annular central groove 80 formed in the outer valve member 42. Fluid flows to the inside of the valve member 42 through a pair of diametrically opposite passages 82 and 84. The inner and outer valve members 40 and 42 may have the same construction and cooperate with each other and the torsion bar 51 in the same manner as described in U.S. Pat. No. 4,276,812 issued Jul. 7, 1981 and entitled "Power Steering Valve and Method of Making Same". However, the inner and outer valve members 40 and 42 could have a different construction if desired.

The control valve 22 may be a "four land" type valve. The inner valve member 40 has a generally square cross-sectional configuration with rounded corners which form the four valving lands that cooperate with the edges of four axially extending grooves formed inside the outer valve member 42 to control the flow of fluid to and from the motor 31. The ends of one pair of diametrically opposite grooves on the inside of the outer valve member 42 are connected in fluid communication with an annular outer groove 88 connected with the motor conduit 28. A second pair of diametrically opposite and axially extending grooves on the inside of the outer valve member 42 are connected in fluid communication with an annular outer groove 90 formed in the outer valve member and connected with the motor conduit 30.

A pair of diametrically opposite openings 94 extend radially inwardly to an axially extending central passage in the inner valve member 40. The central passage is connected in fluid communication with the reservoir 32 by the return conduit 34. The central passage directs fluid flow from the motor 31 to reservoir 32.

One end of the torsion bar 51 is connected to the valve stem 50 and the opposite end of the torsion bar is connected to the follow-up member 54. The torsion bar 51 is disposed in the axially extending central passage. The torsion bar 51 resiliently deflects when subjected to torque in a vehicle steering activity enabling relative rotation between the inner and outer valve members 40 and 42, and when free of torque, urges the inner and outer valve members 40 and 42 to their initial positions, all as is well known in the art.

In accordance with the present invention, the torque required to actuate the control valve 22 increases as vehicle speed increases. At relatively low vehicle speeds, a relatively small torque is required to rotate the inner valve member 40 relative to the outer valve member 42 and hence actuate the hydraulic assist motor 31 making the steering feel less manual. At higher vehicle speeds, a spring force acts on a slidable, annular force transmitting member 116 drivingly connected to the input member 50, a cam assembly 120, and outer valve member 42 which cooperates with the torsion bar 51 to require a relatively larger torque to rotate the inner valve member 40 relative to the outer valve member 42 making the steering feel more manual.

The force transmitting member or slider 116 (FIG. 1) is disposed in the power steering control valve housing 44. The force transmitting member 116 rotates about its central axis 46 with the inner valve member 40 and the valve stem 50 and is movable axially along the valve stem 50 toward and away from the outer valve member 42.

The force transmitting member 116 is connected with the outer valve member 42 by a cam assembly 120. The cam assembly 120 includes a plurality of downwardly facing (as viewed in FIG. 1) cam surfaces 122 on the force transmitting member 116, a plurality of upwardly facing (as viewed in FIG. 1) cam surfaces 124 on the outer valve member 42, and a plurality of balls or spherical cam elements 126 located between the cam surfaces 122 and 124, preferably four of each. However, a greater or lesser number of cam elements 126 and cam surfaces 122 and 124 could be used if desired.

Figure 2:
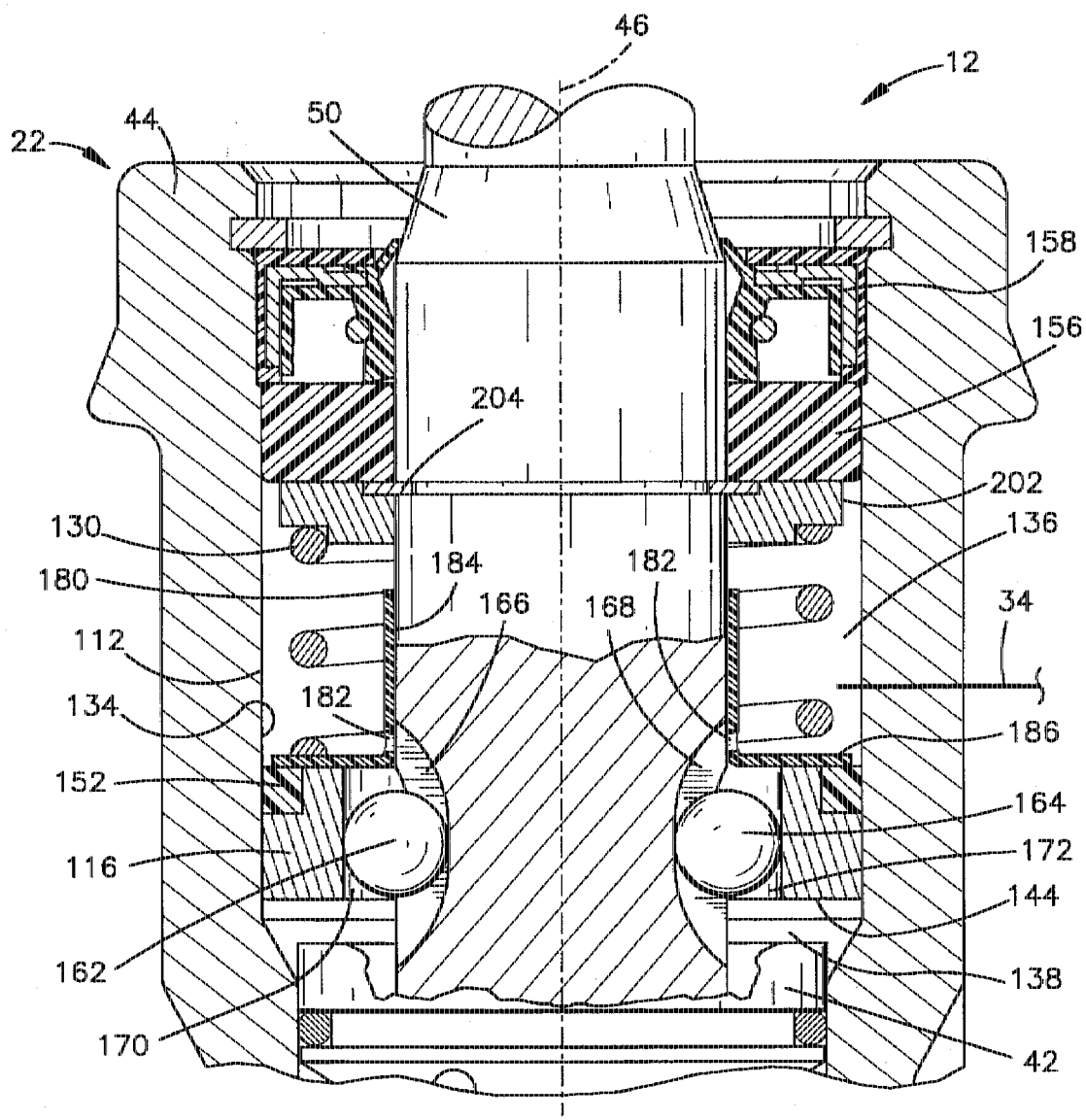
FIG. 2 is an enlarged fragmentary sectional view of a portion of the power steering control valve of FIG. 1.

The force transmitting member 116 is urged axially toward the outer valve member 42 by a spring 130 acting between a collar 202 (FIG. 2), which is held against axial movement relative to the valve stem 50 by a retaining ring 204, and the slidable force transmitting member 116. The force applied against the force transmitting member 116 by the spring 130 urges the cam surfaces 122 and 124 against opposite sides of the balls 126 and maintains and centers the balls on the cam surfaces 122 and 124.

Annular upper surface 142 and annular lower surface 144 of the force transmitting member 116 cooperate with a cylindrical inner side surface 134 of the housing 44 and the cylindrical outer surface 135 of the valve stem 50 to partially define a spring chamber 136 and an annular pressure chamber 138 on axially opposite sides of the force transmitting member 116. The pair of diametrically opposite openings 94 in the inner valve member 40 extend radially inward to the axially extending central passage in the inner valve member 40 in which (a) the torsion bar 51 is located and (b) is used to conduct hydraulic fluid to the chamber 138 through opening 140 extending radially outwardly from the axially extending central passage. The pressure chamber 138 is connected to the reservoir 32 by the return conduit 34.

The spring chamber 136 is sealed by an annular seal 152 that extends around the force transmitting member 116 and an annular seal ring 156 which engages the inner side surface 134 of the housing and the outer side surface of the valve stem 50. A second annular seal ring 158 is provided to seal the upper end of the housing 44.

A pair of retaining elements or balls 162 and 164 (FIG. 2) interconnect the force transmitting member 116 and the valve stem 50 to hold the force transmitting member against rotation relative to the valve stem while allowing the force transmitting member to move axially relative to the valve stem. The spherical retaining elements 162 and 164 engage a pair of diametrically opposite grooves 166 and 168 formed in the valve stem 50 and a pair of axially extending grooves 170 and 172 formed in the force transmitting member 116. Upon rotation of the valve stem 50 relative to the outer valve member 42, the force transmitting member 116 is cammed upwardly, as viewed in FIG. 2. During this movement of the force transmitting member 116, the retaining elements 162 and 164 transmit torque from the valve stem 50 to the force transmitting member 116 to rotate the force transmitting member relative to the housing 44 and the outer valve member 42.

Figure 3:
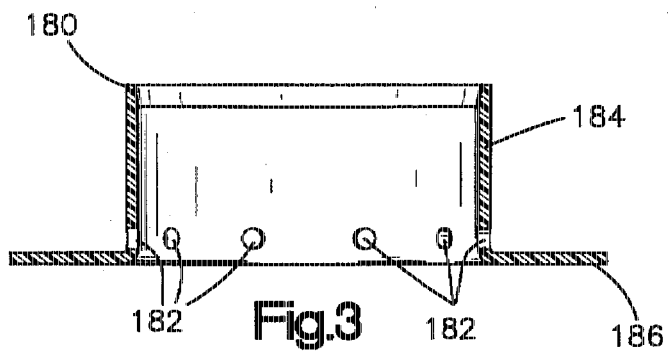
FIG. 3 is a sectional view of a seal of the power steering control valve.

The grooves 166 and 168 in the valve stem and the grooves 170 and 172 in the force transmitting member conduct fluid from the pressure chamber 138 to the spring chamber 136. The return conduit 34 conducts fluid from the spring chamber 136 to reservoir 32. A seal 180 (FIGS. 2 and 3) with a plurality of fixed size bleed orifices 182 restricts the flow of fluid from the pressure chamber 138 to the spring chamber 136 to cause a pressure build up in the chamber 138.

The seal 180 has an axially extending portion 184 engaging the valve stem 50 and a radially extending portion 186 engaging the force transmitting member 116. The plurality of bleed orifices 182 extend through the axially extending portion 184. Fluid is conducted by the grooves 166 and 168 in the valve stem 50 and grooves 170 and 172 in the force transmitting member 116 from the pressure chamber 138, through the bleed orifices 182, to the spring chamber 136.

Rotation of the valve stem 50 and inner valve member 40 relative to the housing 44 and outer valve member 42 is resisted by a force which is related to the spring constant of the torsion bar 51 and a combination of the axial force on the force transmitting member 116 by spring 130 and the fluid pressure force applied against the annular surface 144.

The balls 126 act as driving connections between the force transmitting member 116 and the outer valve member 42. Upon rotation of the inner valve member 40, the cam surfaces 122 and 124 in the force transmitting member 116 and outer valve member 42 create axial and tangential forces on the balls 126 with respect to the force transmitting member 116 and the outer valve member 42. These forces translate into (a) additional torque in the steering column felt by the operator of the vehicle, and (b) resistance to relative rotation of the inner and outer valve members 40 and 42.

Relative rotation between the inner valve member 40 and the outer valve member 42 causes the spherical elements 126 to tend to roll on the cam surfaces 122 and 124 and therefore to move the force transmitting member 116 axially away from the outer valve member 42. Obviously, the force required to move the force transmitting member 116 axially away from the outer valve member 42 varies as a function of the net force urging the force transmitting member 116 toward the outer valve member 42. Thus, the greater the net force pressing the force transmitting member 116 against the balls 126, the greater is the force required to rotate the valve stem 50 and inner valve member 40 relative to the outer valve member 42.

At relatively low vehicle speeds, the electric motor 14 drives the pump 24 at a relatively high speed. Accordingly, the pump 24 produces a relatively high flow rate of fluid from the pump to the control valve 22. The inner valve member 40 and the outer valve member 42 direct fluid to the pressure chamber 138 through the axially extending central passage in the inner valve member. The bleed orifices 182 restrict the flow of fluid from the pressure chamber 138 to reservoir 32. Since the flow rate of fluid from the pump 24 is relatively high, the pressure in chamber 138 is also relatively high. The pressure in the chamber 138 moves the force transmitting member 116 against the bias of the spring 130. Thus, there is little resistance to relative rotation between the valve stem 50 and the outer valve member 42 and the steering effort feels less manual.

At relatively high vehicle speeds, the motor 14 drives the pump 24 at a relatively low speed. The flow rate of the fluid from the pump 24 to the power steering control valve 22 and to reservoir 32 is relatively low. Accordingly, the fluid pressure in chamber 138 is also relatively low. A relatively large force is applied against the force transmitting member 116 toward the outer valve member 42. Thus, there is a relatively large resistance to relative rotation between the valve stem 50 and outer valve member 42. Thus, less hydraulic assist is provided and the steering feels more manual.

Although the fixed size bleed orifices 182 are shown as being located in the seal 180, it is contemplated that a bleed orifice could be located in the valve stem 50, in the housing 44, or along the return conduit 34.

From the above description of the invention, those skilled in the art will perceive improvements, changes and modifications. Such improvements, changes and modifications within the skill of the art are intended to be covered by the appended claims.

Having described the invention, the following is claimed:

1. A steering system comprising:

first and second valve members which are movable relative to each other to port fluid to a vehicle power steering motor;

means for providing fluid to said first and second valve members and the power steering motor;

a force transmitting member connected with said first valve member and movable toward and away from said second valve member for applying a force to resist relative movement between said first and second valve members;

means defining a fluid pressure chamber for receiving fluid from said fluid providing means, the pressure of which acts on said force transmitting member, said first and second valve members including means for conducting fluid to said fluid pressure chamber;

means for conducting fluid from said chamber to a reservoir, including means for restricting the flow of fluid from said chamber to said reservoir, said restricting means including a bleed orifice for conducting fluid from said chamber to said reservoir;

means for varying the flow rate of fluid to said chamber from said fluid providing means as a function of vehicle speed to vary the pressure in said chamber and the resistance to relative movement between said first and second valve members as a function of vehicle speed; and seal means for restricting fluid flow from said chamber to said reservoir, said bleed orifice being located in said seal means.

2. A steering system as set forth in claim 1 wherein said bleed orifice has a fixed size.

3. A steering system as set forth in claim 1 wherein said seal means includes an axially extending portion engaging said first valve member and a radially extending portion engaging said force transmitting member.

4. A steering system as set forth in claim 3 wherein said bleed orifice is located in said axially extending portion.

5. A steering system as set forth in claim 4 wherein said axially extending portion includes a plurality of bleed orifices for conducting fluid from said chamber to said reservoir.

6. A steering system as set forth in claim 1 wherein said first valve member includes means for defining a passage for conducting fluid from said chamber to said reservoir, said seal means restricting fluid flow from said passage to said reservoir.

7. A steering system as set forth in claim 6 further including means for connecting said force transmitting member with said first valve member, said connecting means being located in said passage.

8. A steering system as set forth in claim 6 wherein said force transmitting member includes means for defining said passage for conducting fluid from said chamber.

9. A steering system as set forth in claim 1 wherein said flow rate varying means includes means for decreasing the flow rate of fluid to said chamber in response to an increase in vehicle speed.

10. A steering system as set forth in claim 9 further including spring means for pressing said force transmitting member toward said second valve member, said spring means being located on a side of said force transmitting member opposite from said chamber, the pressure in said chamber acting on said force transmitting member to urge said force transmitting member away from said second valve member.

11. A steering system as set forth in claim 1 wherein said force transmitting member includes a first cam surface and said second valve member includes a second cam surface, said first and second cam surfaces abuttingly engaging a member disposed between said first and second surfaces.

12. A steering system comprising:

first and second valve members which are movable relative to each other to port fluid to a vehicle power steering motor;

means for providing fluid to said first and second valve members and the power steering motor;

a force transmitting member connected with said first valve member and movable toward and away from said second valve member for applying a force to resist relative movement between said first and second valve members;

means defining a fluid pressure chamber for receiving fluid from said fluid providing means, the pressure of which acts on said force transmitting member, said first and second valve members including means for conducting fluid to said fluid pressure chamber;

means for conducting fluid from said chamber to a reservoir, including means for restricting the flow of fluid from said chamber to said reservoir; and means for varying the flow rate of fluid to said chamber from said fluid providing means as a function of vehicle speed to vary the pressure in said chamber and the resistance to relative movement between said first and second valve members as a function of vehicle speed, said fluid providing means including a pump and said flow rate varying means including a variable speed motor for driving said pump.

13. A steering system as set forth in claim 12 wherein said flow rate varying means further includes means for varying the speed of said variable speed motor as a function of vehicle speed.

14. A steering system as set forth in claim 13 wherein said means for varying the speed of said variable speed motor includes means for decreasing the speed of said variable speed motor and the flow rate of fluid to said chamber in response to increasing vehicle speed.

15. A steering system comprising:

first and second valve members which are movable relative to each other to port fluid to a vehicle power steering motor;

means for providing fluid to said first and second valve members and the power steering motor;

a force transmitting member connected with said first valve member and movable toward and away from said second valve member for applying a force to resist relative movement between said first and second valve members;

spring means for applying a force to said force transmitting member to urge said force transmitting member toward said second valve member;

means defining a fluid pressure chamber for receiving fluid from said fluid providing means, the pressure of which acts on said force transmitting member to urge said force transmitting member away from said second valve member, said fluid pressure chamber being located on a side of said force transmitting member opposite said spring means, said first and second valve members including means for conducting fluid to said fluid pressure chamber;

a fixed size orifice conducting fluid from said chamber to a reservoir, said orifice restricting the flow of fluid from said chamber to said reservoir;

means for decreasing the flow rate of fluid to said chamber from said fluid providing means as vehicle speed increases to decrease the pressure in said chamber and increase the resistance to relative movement between said first and second valve members; and seal means for restricting fluid flow from said chamber to reservoir, said bleed orifice being located in said seal means.

16. A steering system as set forth in claim 15 wherein said seal means includes an axially extending portion engaging said first valve member and a radially extending portion engaging said force transmitting member, said bleed orifice being located in said axially extending portion.

17. A steering system as set forth in claim 16 wherein said first valve member includes means for defining a passage for conducting fluid from said chamber to said reservoir, said seal means restricting fluid flow from said passage to said reservoir.

18. A steering system as set forth in claim 17 wherein said force transmitting member includes means for defining said passage for conducting fluid from said chamber.

19. A steering system as set forth in claim 18 further including means for connecting said force transmitting member with said first valve member, said connecting means being located in said passage.

20. A steering system as set forth in claim 15 wherein said force transmitting member includes a first cam surface and said second valve member includes a second cam surface, said first and second cam surfaces abuttingly engaging a member disposed between said first and second cam surfaces.

21. A steering system comprising:

first and second valve members which are movable relative to each other to port fluid to a vehicle power steering motor;

means for providing fluid to said first and second valve members and the power steering motor;

a force transmitting member connected with said first valve member and movable toward and away from said second valve member for applying a force to resist relative movement between said first and second valve members;

spring means for applying a force to said force transmitting member to urge said force transmitting member toward said second valve member;

means defining a fluid pressure chamber for receiving fluid from said fluid providing means, the pressure of which acts on said force transmitting member to urge said force transmitting member away from said second valve member, said fluid pressure chamber being located on a side of said force transmitting member opposite said spring means, said first and second valve members including means for conducting fluid to said fluid pressure chamber;

a fixed size orifice conducting fluid from said chamber to a reservoir, said orifice restricting the flow of fluid from said chamber to said reservoir; and means for decreasing the flow rate of fluid to said chamber from said fluid providing means as vehicle speed increases to decrease the pressure in said chamber and increase the resistance to relative movement between said first and second valve members, said fluid providing means including a pump, said flow rate decreasing means including a variable speed motor for driving said pump and means for decreasing the speed of said variable speed motor as vehicle speed increases.

* * * * *